United States Patent
Ye et al.

(10) Patent No.: US 11,151,277 B1
(45) Date of Patent: Oct. 19, 2021

(54) METHOD TO RECOVER ENCRYPTED STRUCTURED FILES

(71) Applicant: EMC IP Holding Company LLC, Hopkinton, MA (US)

(72) Inventors: Qin Ye, Frisco, TX (US); Adam Meek, Richardson, TX (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 306 days.

(21) Appl. No.: 16/522,441

(22) Filed: Jul. 25, 2019

(51) Int. Cl.
*G06F 11/07* (2006.01)
*G06F 21/62* (2013.01)
*G06F 21/60* (2013.01)
*G06F 12/14* (2006.01)
*G06F 21/56* (2013.01)

(52) U.S. Cl.
CPC ...... *G06F 21/6227* (2013.01); *G06F 11/0793* (2013.01); *G06F 12/1408* (2013.01); *G06F 21/568* (2013.01); *G06F 21/602* (2013.01)

(58) Field of Classification Search
CPC .. G06F 21/602; G06F 21/6227; G06F 21/568; G06F 11/0793; G06F 12/1408
See application file for complete search history.

(56) References Cited

U.S. PATENT DOCUMENTS

| | | | | |
|---|---|---|---|---|
| 2011/0191533 | A1* | 8/2011 | Coulter | G06Q 10/00 711/112 |
| 2012/0221854 | A1* | 8/2012 | Orsini | H04L 63/0876 713/167 |
| 2013/0226923 | A1* | 8/2013 | Thing | G06F 16/1724 707/737 |
| 2018/0145995 | A1* | 5/2018 | Roeh | H04L 43/16 |
| 2019/0018601 | A1* | 1/2019 | Dubeyko | G06F 3/067 |

* cited by examiner

*Primary Examiner* — Matthew T Henning
(74) *Attorney, Agent, or Firm* — Womble Bond Dickinson (US) LLP (57) ABSTRACT

A method for recovering encrypted content from structured files is provided. During an encryption process, a known pattern of metadata may be inserted into each of a set of headers of the encrypted content and each of a set of footers of the encrypted content. The processing logic may insert the encrypted content into a structured file and subsequently (e.g., during an attempt to access the content) detect that a structure of the structured file has been damaged. The encrypted content may be identified by identifying one or more of the set of headers and one or more of the set of footers of the encrypted content. In this way, the method allows for partial recovery of encrypted content and prevents total loss of the content in situations where the structure of the file including the encrypted content is damaged.

20 Claims, 7 Drawing Sheets

Header 220A
Special Pattern (start)
Original File Name
Version Number
Key ID
Encryption Standard

Encrypted Content 220

Footer 220B
Special Pattern (end)

*FIG. 2B*

| Header 221A |
|---|
| Chunk 221 |
| Footer 221B |
| Header 222A |
| Chunk 222 |
| Footer 222B |
| Header 223A |
| Chunk 223 |
| Footer 223B |

METHOD TO RECOVER ENCRYPTED STRUCTURED FILES

TECHNICAL FIELD

Aspects of the present disclosure relate to encrypting and decrypting files, and more particularly, to recovering content from encrypted structured files.

BACKGROUND

Structured files (e.g., structured documents such as portable document format (PDF) and Microsoft Office™ documents) rely on the software opening them to understand their structure and render the contents correctly. Such documents contain internal file structure references that may be used to locate content of the document. For example, internal file structure references may include references to all the objects in a structured document and thus may allow random access to content (e.g., objects) in the file, so that the whole structured document need not be read to locate a particular object. However, if the structure of the document (e.g., internal file structure references) is damaged, this may prevent the content of the structured document from being opened or recovered.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, structured files rely on the software opening them to understand their structure and render the contents correctly. Such files contain internal file structure references that may be used to locate content of the file. For example, internal file structure references may include references to all the objects in a structured file and thus may allow random access to content (e.g., objects) in the file, so that the whole structured file need not be read to locate a particular object. The content in a structured file may also be encrypted, which may provide better security than password protection. However, if the structure of the file (e.g., internal file structure references) is damaged, the content cannot be identified and is unreadable, even if the content itself is intact.

In situations where the file structure is damaged, the encrypted content can not be located, retrieved and decrypted, thus causing a total loss of the encrypted content. Aspects of the present disclosure address the above-noted and other deficiencies by using a processing logic to insert, during an encryption process, a known pattern of metadata into each of a set of headers of the encrypted content and each of a set of footers of the encrypted content. The processing logic may insert the encrypted content into a structured file and subsequently (e.g., during an attempt to access the content) detect that a structure of the structured file has been damaged. The processing logic may identify the encrypted content by identifying one or more headers and one or more footers of the encrypted content.

Figure 1:
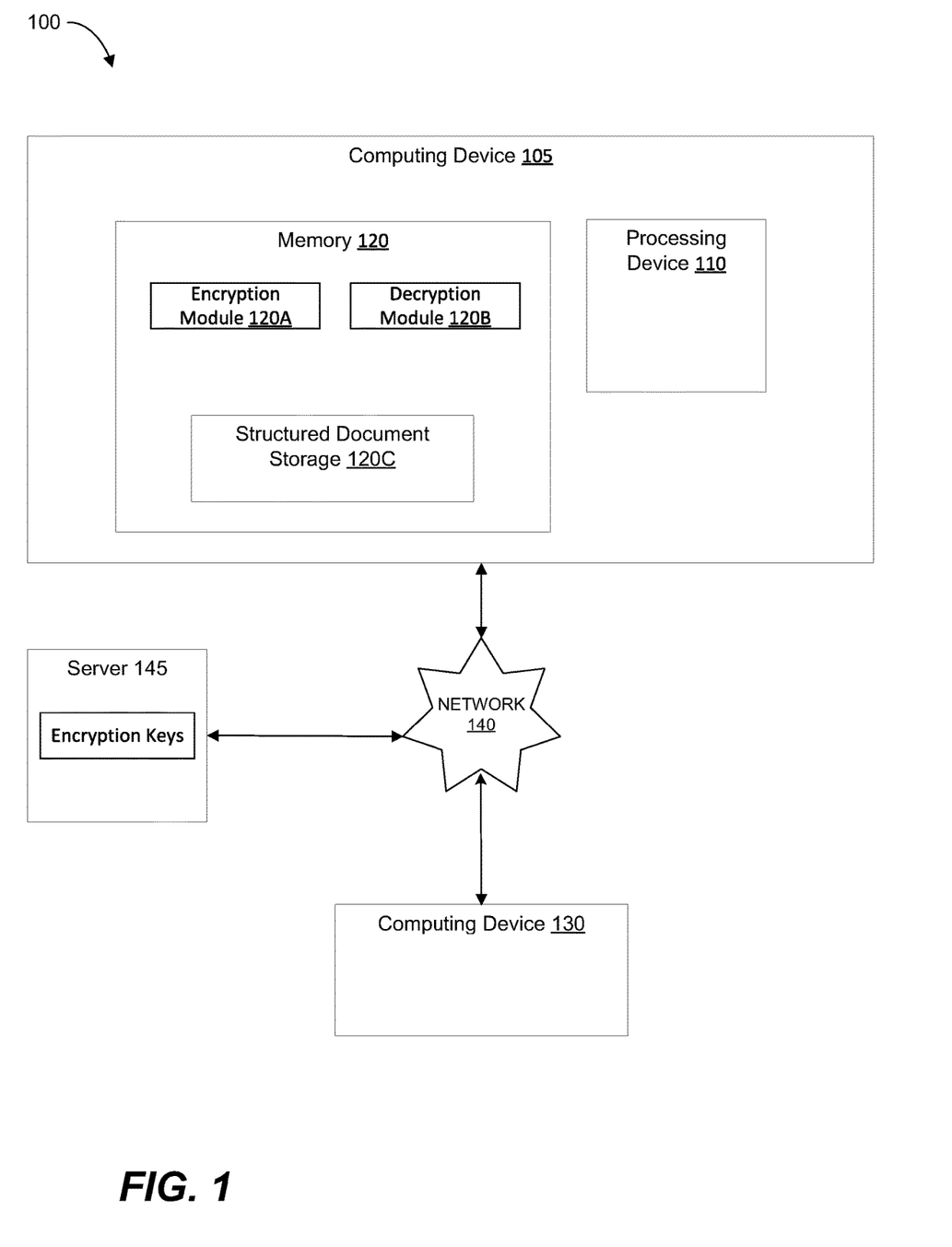
FIG. 1 is a block diagram that illustrates an example system, in accordance with some embodiments of the present disclosure.

FIG. 1 is a block diagram that illustrates an example system 100. As illustrated in FIG. 1, the system 100 includes computing device 105, computing device 130, server 145 and a network 140. The computing device 105, computing device 130 and the server 145 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 105, computing device 130 and the server 145.

As illustrated in FIG. 1, the computing device 105 may include a processing device 110 and a memory 120 (e.g., hard-disk drive (HDD), solid-state drive (SSD), etc.). Memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 105. Computing device 105 may also include random access memory (RAM) and other hardware devices (e.g., sound card, video card, etc.) (not shown in the FIGS for ease of illustration). Computing device 105 may comprise any suitable type of computing device or machine that has a programmable processor including, for example, server computers, desktop computers, laptop computers, tablet computers, smartphones, set-top boxes, etc. In some examples, the computing device 105 may comprise a single machine or may include multiple interconnected machines (e.g., multiple servers configured in a cluster).

Computing device 105 may execute or include an operating system (OS) (not shown in the FIGS). The OS of computing device 105 may manage the execution of other components (e.g., software, applications, etc.) and/or may manage access to the hardware (e.g., processors, memory, storage devices etc.) of the computing device 105.

Memory 120 may also include encryption software (SW) module 120A and decryption SW module 120B. Memory 120 may also include structured file storage 120C, which may be used to store encrypted structured files. Computing device 105 (via processing device 110) may execute encryption software (SW) module 120A and decryption SW module 120B to perform the operations described herein. For example, upon receiving content to be encrypted and placed in a structured file, computing device may execute encryption software (SW) module 120A. Computing device 105 may encrypt the content using any suitable encryption method to generate encrypted content. Computing device 105 may then place the encrypted content into a structured file (e.g., PDF or Microsoft™ Office™ document) and store the structured file in structured document storage 120C.

Figure 2A:
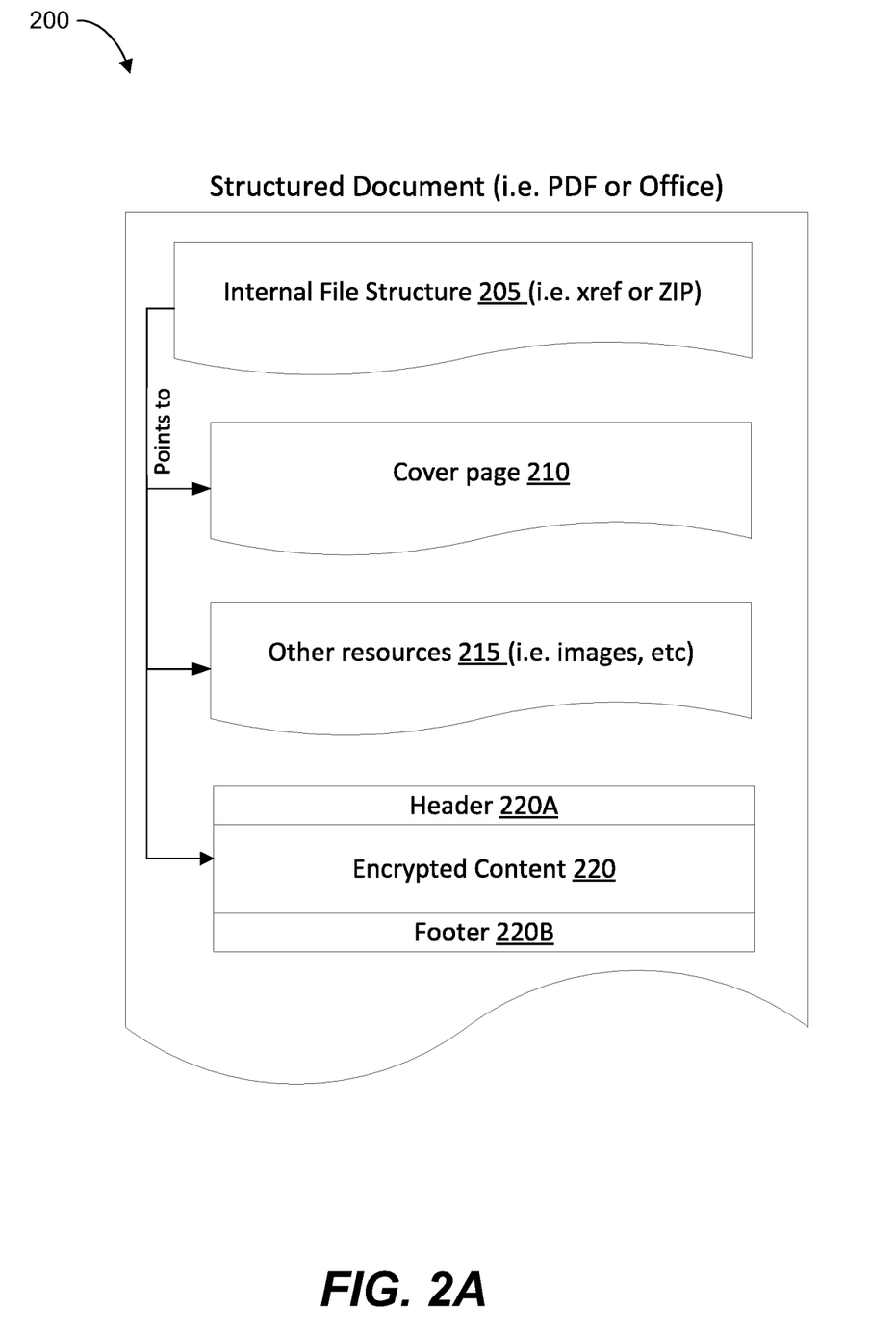
FIG. 2A is a diagram of a structured file, in accordance with some embodiments of the present disclosure.
Figure 2B:
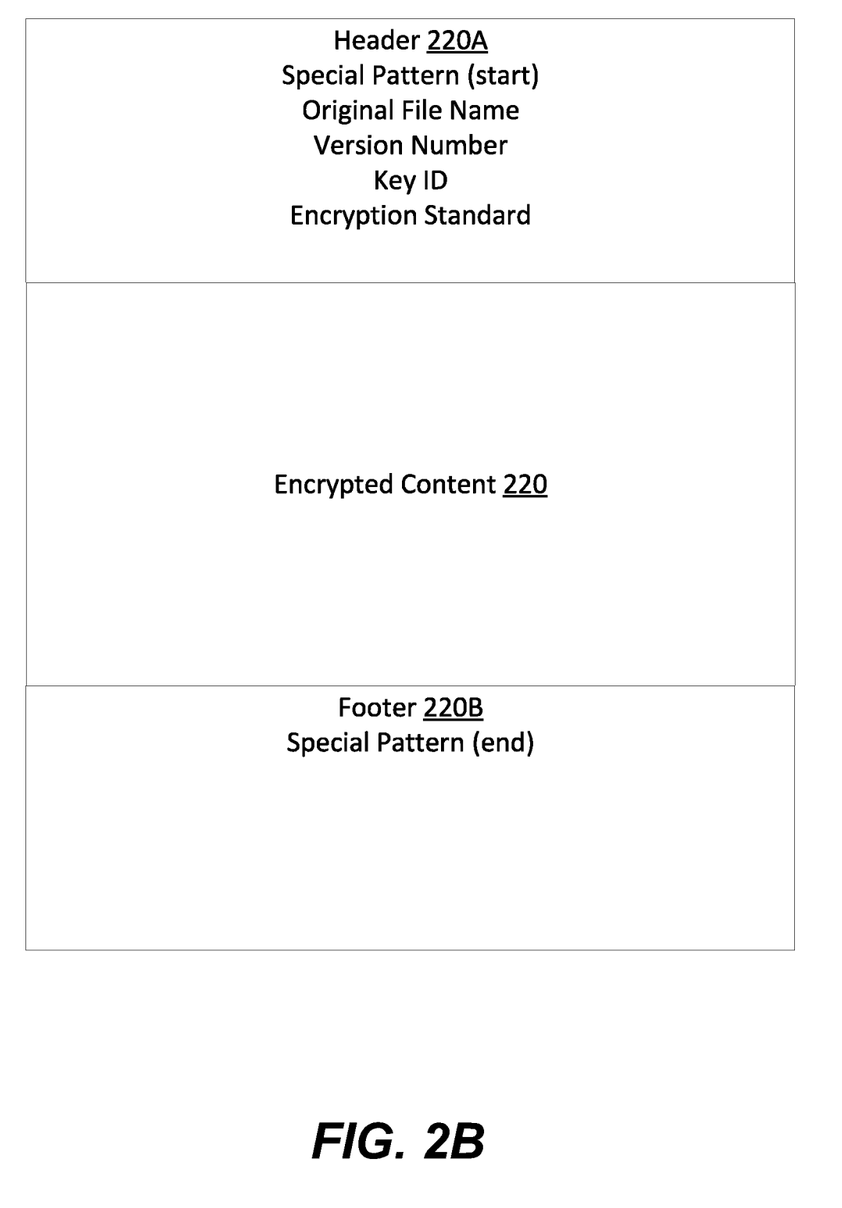
FIG. 2B is a diagram of encrypted content illustrating encryption headers and footers, in accordance with some embodiments of the present disclosure.

FIG. 2A illustrates a structured file 200 having encrypted content 220, in accordance with some embodiments of the present disclosure. The encrypted content 220 may include a number of objects (not shown). Structured file 200 may include an internal file structure 205, which includes references to all the objects in the encrypted content 220. The internal file structure 205 may allow random access to the encrypted content 220 (e.g., objects) in the file, so that the whole structured file 200 need not be read to locate a particular object. In some embodiments, the internal file structure 205 may include internal tables and cross-links that make up the anatomy of the structured file 200. The internal file structure 205 may be used as a reference to access other parts of the structured file 200 such as the cover page 210, other resources 215, and the encrypted content 220. During the encryption process, computing device 105 may append a header 220A and a footer 220B to the content to be encrypted and insert known patterns of metadata regarding the encryption process into the header 220A and footer 220B. For example, as shown in FIG. 2B, header 220A may include a known pattern including metadata such as a special pattern, the original file name of the content to be encrypted, the encryption standard used, the version number of the encryption standard used and the ID of the encryption key that was used to encrypt the content, among other information. In addition, footer 220B may include the special pattern. The special pattern may be any appropriate sequence of characters such as letters, numbers, special characters or any other sequence of characters that may serve to identify a header and footer. The metadata illustrated in FIG. 2B is for example only, and the metadata included in a known pattern may be based on the method of encryption used and may include any appropriate metadata regarding the encryption process.

Figure 3:
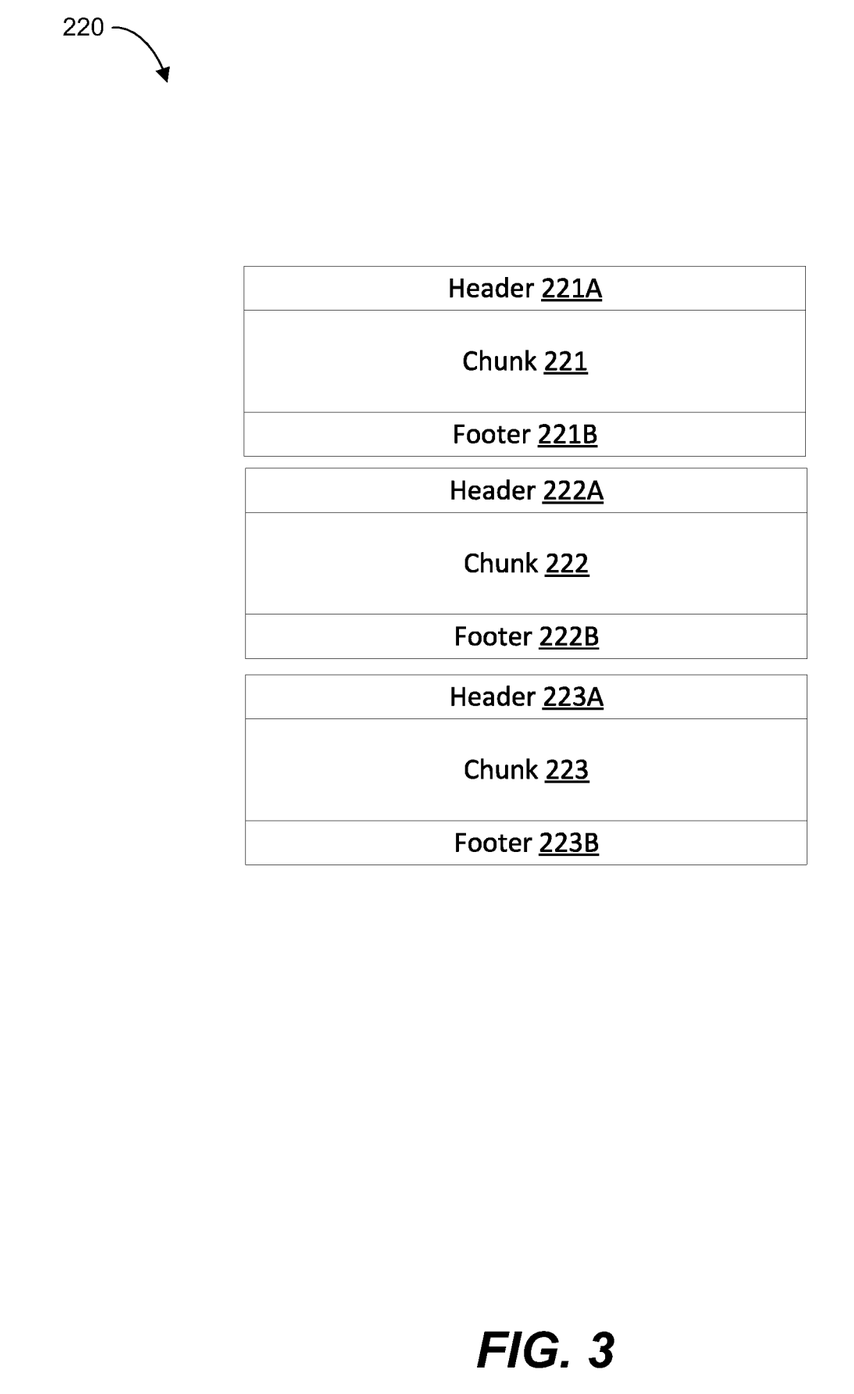
FIG. 3 is a diagram that illustrates encrypted content that has been divided into a set of chunks, in accordance with some aspects of the present disclosure.

In some embodiments, computing device 105 may divide the content into a set of chunks. Computing device 105 may divide the content into chunks of any appropriate size. For example, if the content is a document, a user could request one chunk per page of the document, for the document to be broken evenly between a given number of chunks, or manually indicate where the document be broken into chunks. In some embodiments, the chunks in the set of chunks may each be a different size. In some embodiments, computing device 105 may use a deterministic algorithm to divide the content up into a set of chunks. Upon determining the size and number of chunks in the set, computing device 105 may encrypt each chunk and append a header and footer to each individual chunk during the encryption process as shown in FIG. 3. FIG. 3 illustrates encrypted content 220 that has been divided into chunks 221-223. During the encryption process, computing device 105 may insert a header and footer to each individual chunk 221-223, as illustrated in FIG. 3. The header and footer of each individual chunk may include the known patterns of metadata described above with respect to FIG. 2B. In this way, the header and footer of each chunk may act as a start marker and end marker respectively for that chunk so that the chunk can be identified as discussed in further detail herein. Computing device 105 may then insert the (divided) encrypted content 220 into the structured file 200 and store the structured file 200 including encrypted content 220 into the structured document storage 120C. Computing device 105 may request the encryption key or decryption key as needed from server 145. Alternatively, in some embodiments, computing device 105 may transmit the structured file 200 including encrypted content 220 to computing device 130 Computing device 130 may request the encryption key or decryption key as needed from server 145.

Upon receiving a request to access the content of structured file 200 from the structured document storage 120C, computing device 105 may execute the decryption SW module 120B. Computing device 105 may determine whether there has been damage to the structure of the structured file 200. For example, computing device 105 may determine whether there has been damage to the internal file structure 205 and/or damage to either header 220A or footer 220B. In some embodiments, computing device 105 may determine whether there has been damage to the internal file structure 205, or damage to any of headers 221A-223A or footers 221B-223B. For example, computing device 105 may not recognize the encrypted content 220 as valid, and remove a reference to it from the internal file structure 205 of the structured file 200. In another example, computing device 105 may read header 220A and decide that the encrypted content 220 is invalid and attempt to repair the header 220A by modifying it. This may cause a change in the header 220A which would cause it to be unreadable. In other examples, header 220A and/or footer 220B may simply be corrupted. In these cases, computing device 105 would be unable to identify/locate the encrypted content. In some embodiments, upon determining that there has been damage to the internal file structure 205, computing device 105 may attempt to identify the encrypted content 220 by attempting to identify header 220A and footer 220B, which are acting as start and end markers respectively for the encrypted content 220. In some embodiments, upon determining that there has been damage to the internal file structure 205, computing device 105 may attempt to identify each subsequent chunk 221-223 based on each chunk's respective header and footer. The header and footer of each chunk 221-223 may act as start and end markers respectively for that chunk.

For example, computing device 105 may identify chunk 221 by locating header 221A and footer 221B. Computing device 105 may locate header 221A and footer 221B by identifying the known pattern of metadata in each. In some embodiments, computing device 105 must detect the known pattern exactly as it appears. In the example of FIG. 2B, computing device 105 must identify the special pattern, the original file name of the content to be encrypted, the encryption standard used, the version number of the encryption standard used and the ID of the encryption key that was used to encrypt the content in the header 221A in that particular order and identify the special pattern in the footer 221B. In other embodiments, computing device 105 may detect the special pattern, the original file name of the content to be encrypted, the version number of the encryption standard used, the ID of the encryption key that was used to encrypt the content, and the encryption standard used in the header 221A regardless of the order and identify the special pattern in the footer 221B. Computing device 105 may identify each chunk by iterating through each start and end marker (e.g., the header and footer for each chunk) that is detected. Upon identifying each chunk, computing device 105 may decrypt each identified chunk and reassemble the encrypted content.

In some embodiments, the structural damage to the file may extend to one or more chunks of the set of chunks 221-223. For example, computing device 105 may determine that in addition to the internal file structure 205 being damaged, header 222A of chunk 222 has also been damaged. In this situation, computing device 105 can no longer identify chunk 222 as its header (start marker) is damaged, however computing device 105 may still identify chunks 221 and 223, since their respective headers and footers are intact, and may still decrypt and recover the content from chunks 221 and 223. In this way, instead of experiencing total loss of content due to damage to the internal file structure 205 and/or the respective headers or footers of one or more of chunks 221-223, computing device 105 may perform a partial recovery and preserve some of the encrypted content 221-223. Embodiments of the present disclosure thus allow computing device 105 to undertake a fine grained level of recovery. In some embodiments, a user may elect to recover only certain chunks from the set of chunks that the content is divided into.

In some embodiments, upon generating the encrypted content 220, computing device 105 may transmit the structured file 200 including encrypted content 220 to computing device 130, which may be another computing device within the network of computing device 105. Computing device 105 may additionally store the ID of the key used for encryption. If a user on computing device 130 wishes to decrypt the encrypted content, they may send a request to server 145 for the encryption key used. Upon receiving the request, server 145 may authenticate computing device 130 using any known methodology and transmit the encryption key used. Computing device 130 may then perform the decryption process described above to decrypt and recover encrypted content 220 (or parts thereof).

Figure 4A:
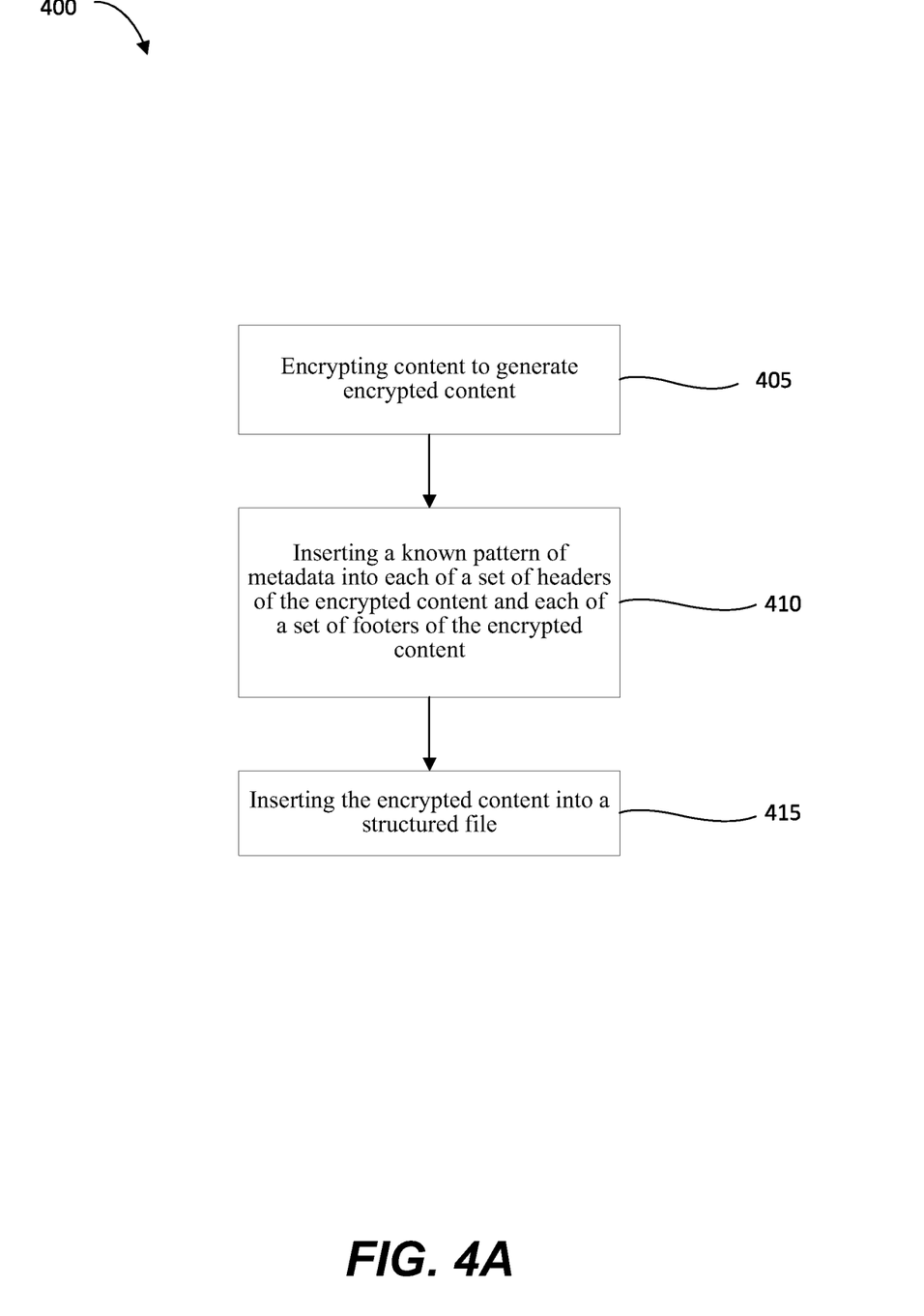
FIG. 4A is a flow diagram of a method of encryption, in accordance with some embodiments of the present disclosure.

FIG. 4A is a flow diagram of a method 400 for encrypting content, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 105 illustrated in FIG. 1).

With continued reference to FIGS. 2B and 3 as well, upon receiving content to be encrypted and placed in a structured file, at block 405 computing device 105 may encrypt the content using any suitable encryption method to generate encrypted content. During the encryption process, at block 410, computing device 105 may append a header 220A and a footer 220B to the content to be encrypted and insert known patterns of metadata regarding the encryption process into header 220A and a footer 220B. For example, as shown in FIG. 2B, header 220A may include a known pattern including metadata such as the special pattern, the original file name of the content to be encrypted, the encryption standard used, the version number of the encryption standard used and the ID of the encryption key that was used to encrypt the content, among other information. And footer 220B has special pattern. Computing device 105 may then place the encrypted content into a structured file (e.g., PDF or Microsoft Office™ document).

In some embodiments, computing device 105 may divide the content into a set of chunks. Computing device 105 may divide the content into chunks of any appropriate size. For example, if the content is a document, a user could request one chunk per page of the document, for the document to be broken evenly between a given number of chunks, or manually indicate where the document be broken into chunks. In some embodiments, the chunks in the set of chunks may be different sizes. In some embodiments, computing device 105 may use a deterministic algorithm to divide the content up into a set of chunks. Upon determining the size and number of chunks in the set, computing device 105 may encrypt each chunk, append a header and footer to each individual chunk and insert a known pattern of metadata into the header and footer of each individual chunk during the encryption process as shown in FIG. 3. At block 415, computing device 105 may insert the encrypted content into a structured document.

More specifically, computing device 105 may then insert the (divided) encrypted content 220 into the structured file 200 and store the structured file 200 including encrypted content 220 into the structured document storage 120C. Computing device 105 may request the encryption key or decryption key as needed from server 145. Alternatively, in some embodiments, computing device 105 may transmit the structured file 200 including encrypted content 220 to computing device 130, which may request the encryption key or decryption key as needed from server 145.

Figure 4B:
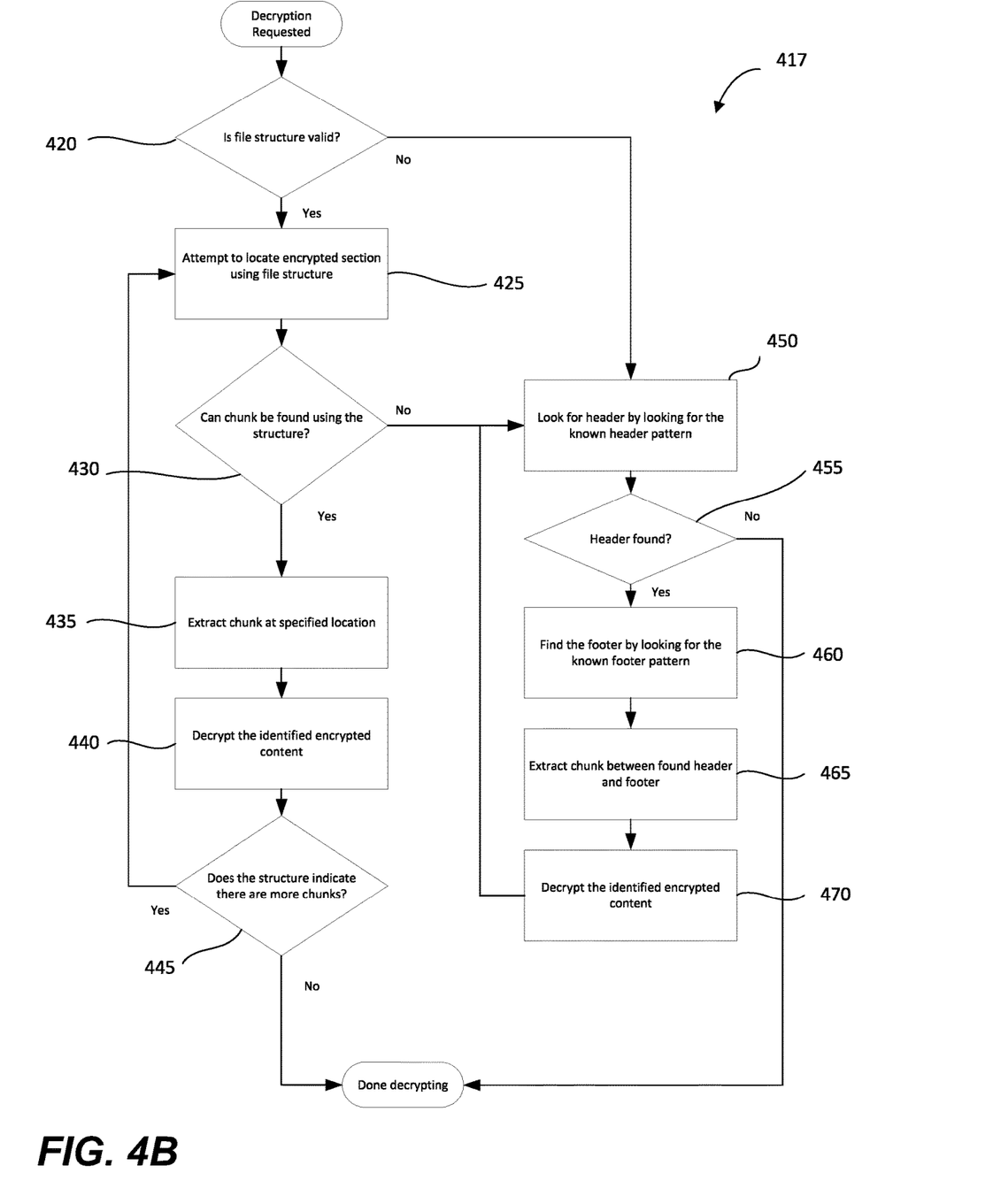
FIG. 4B is a flow diagram of a method of decryption, in accordance with some embodiments of the present disclosure.

FIG. 4B is a flow diagram of a method 417 for recovering encrypted content from structured files, in accordance with some embodiments. Method 417 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. The method 417 may be performed by a computing device (e.g., computing device 105 or computing device 130 illustrated in FIG. 1). For example, if a user of computing device 105 wishes to decrypt the encrypted content of the structured file 200, they may send a request to server 145 for the encryption key used. Upon receiving the request, server 145 may authenticate computing device 105 using any known methodology and transmit the encryption key used to the computing device 105. Computing device 105 may then perform the decryption process described below to decrypt and recover encrypted content 220 (or parts thereof).

In some embodiments, computing device 130 may store the structured file 200 after having received it from computing device 105 as discussed above. If a user on computing device 130 wishes to decrypt the encrypted content of the structured file 200, they may send a request to server 145 for the encryption key used. Upon receiving the request, server 145 may authenticate computing device 130 using any known methodology and transmit the encryption key used to the computing device 130. Computing device 130 may then perform the decryption process described below to decrypt and recover encrypted content 220 (or parts thereof).

At block 420 (with continued reference to FIGS. 2B and 3 as well), computing device 105 may determine whether the internal file structure 205 is valid or not. For example, computing device 105 may determine whether there has been damage to the internal file structure 205 and/or damage to either header 220A or footer 220B. In some embodiments, computing device 105 may determine whether there has been damage to the internal file structure 205 or damage to any of headers 221A-223A or footers 221B-223B. For example, computing device 105 may not recognize the encrypted content 220 as valid, and remove a reference to it from the internal file structure 205 of the structured file 200. In another example, computing device 105 may read header 220A and decide that the encrypted content 220 is invalid and attempt to repair the header 220A by modifying it. This may cause a change in the header 220A which would cause it to be unreadable. In other examples, header 220A and/or footer 220B may simply be corrupted. In these cases, computing device 105 would be unable to identify/locate the encrypted content 220.

If the internal file structure 205 is not valid, computing device 105 may identify the encrypted content based at least in part on identifying one or more headers and one or more footers of the encrypted content. For example, upon determining that there has been damage to the internal file structure 205, computing device 105 may attempt to identify the encrypted content 220 by attempting to identify header 220A and footer 220B, which are acting as start and end markers respectively for the encrypted content 220. In some embodiments, upon determining that there has been damage to the internal file structure 205, computing device 105 may attempt to identify each individual chunk 221-223 based on each chunk's respective header and footer. The header and footer of each chunk 221-223 may act as start and end markers respectively for that chunk.

For example, at block 450, computing device 105 may identify chunk 221 by locating header 221A. Computing device 105 may locate header 221A by identifying the known pattern of metadata in header 221A. In some embodiments, computing device 105 must detect the known pattern exactly as it appears. In the example of FIG. 2B, computing device 105 must identify the special pattern, the original file name of the content to be encrypted, the encryption standard used, the version number of the encryption standard used and the ID of the encryption key that was used to encrypt the content in the header 221A in that particular order. In other embodiments, computing device 105 may detect the special pattern, the original file name of the content to be encrypted, the version number of the encryption standard used, the ID of the encryption key that was used to encrypt the content, and the encryption standard used in the header 221A in different orders and identify the special pattern in footer 221B. At block 455, if the header 221A cannot be found, (i.e. the meta data including the known pattern of metadata cannot be recognized) then computing device 105 may determine that the file cannot be decrypted (and thus that decryption is complete). At block 455, if the header 221 is located, then at block 460 computing device 105 must identify the footer 221B by identifying the special pattern in the footer 221B to locate the footer 221B. At block 465, upon locating the footer 221B, computing device 105 may extract the encrypted content between header 221A and footer 221B and at block 470 may decrypt the extracted content. In this way, computing device 105 may identify each chunk by iterating through each start and end marker (e.g., the header and footer for each chunk) that is detected. Upon identifying each chunk, computing device 105 may decrypt each identified chunk and reassemble the encrypted content, at which point the decryption may be completed.

In some embodiments, the structural damage to the file may extend to one or more chunks of the set of chunks 221-223. For example, computing device 105 may determine that in addition to the internal file structure 205 being damaged, header 222A of chunk 222 has also been damaged. In this situation, computing device 105 can no longer identify chunk 222 as its header (start marker) is damaged, however computing device 105 may still identify chunks 221 and 223, since their respective headers and footers are intact, and may still decrypt and recover the content from chunks 221 and 223. In this way, instead of experiencing total loss of content due to damage to the internal file structure 205 and any of the respective headers or footers of one or more of chunks 221-223, computing device 105 may perform a partial recovery and preserve some of the encrypted content 220. Embodiments of the present disclosure thus allow computing device 105 to undertake a fine grained level of recovery. In some embodiments, a user may elect to recover only certain chunks from the set of chunks that the content is divided into.

If at block 420, computing device 105 determines that the internal file structure 205 is valid, at block 425 it may attempt to locate the encrypted content 220 using the internal file structure 205. At block 430, if the encrypted content 220 cannot be found using the internal file structure 205, then method 417 may proceed to block 450, discussed above. If the encrypted content 220 is found using the internal file structure 205, then at block 435 the encrypted content 220 may be extracted at the location specified by the internal file structure 205 and at block 440 computing device 105 may decrypt the identified encrypted content. In some embodiments, computing device 105 may identify the encrypted content on a chunk by chunk basis, in which case at block 445, it may determine whether there are additional chunks to be located and may proceed to block 425.

Figure 5:
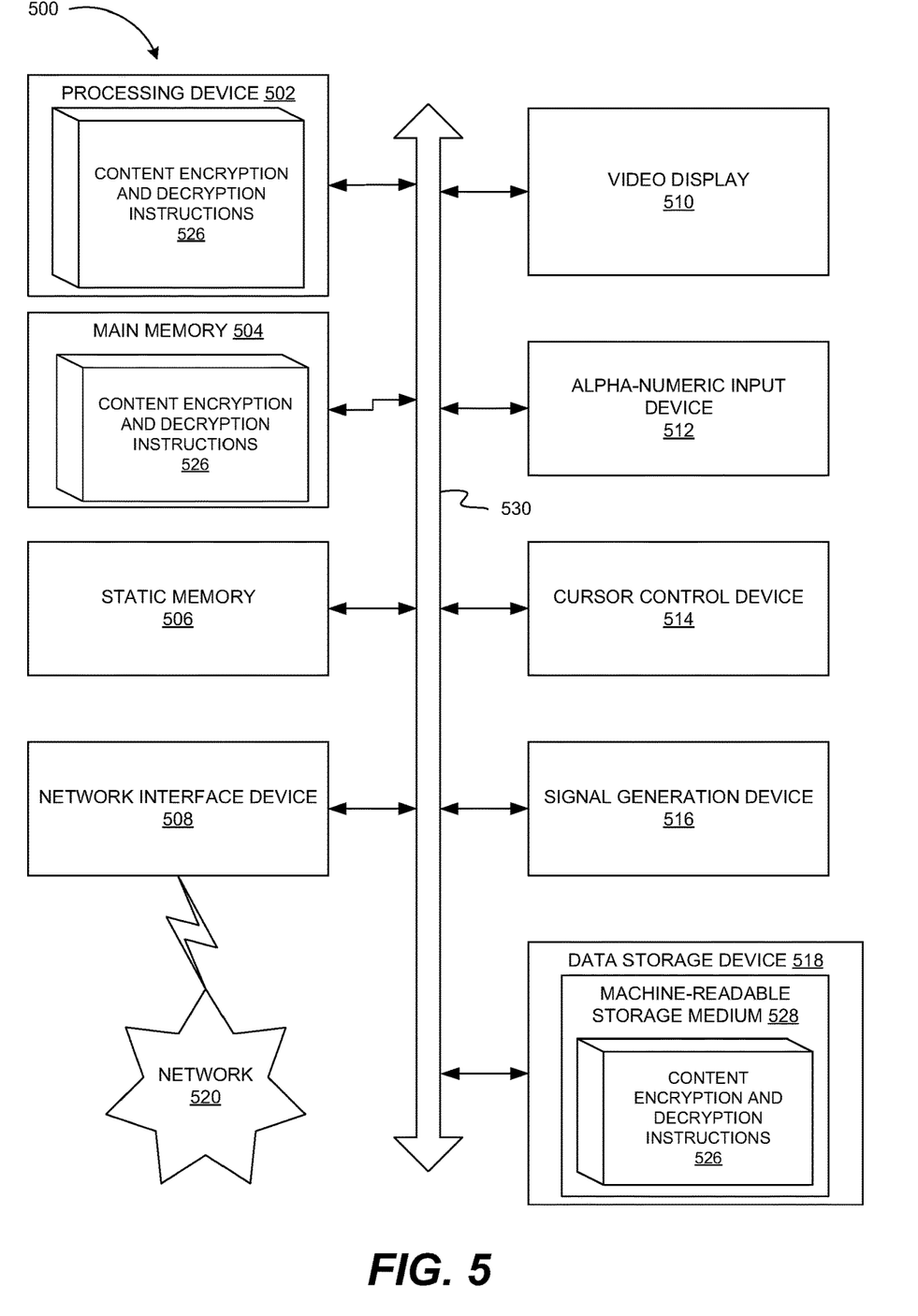
FIG. 5 is a block diagram of an example computing device, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for encrypting and decrypting structured files is stored.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 400 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute content encryption and decryption instructions 526, for performing the operations and steps discussed herein.

The data storage device 518 may include a machine-readable storage medium 528, on which is stored one or more sets of structured file encryption/decryption instructions 526 (e.g., software) embodying any one or more of the methodologies of functions described herein, including instructions to cause the processing device 502 to execute SW modules 120A and 120B shown in FIG. 1. The content encryption and decryption instructions 526 may also reside, completely or at least partially, within the main memory 504 or within the processing device 502 during execution thereof by the computer system 500; the main memory 504 and the processing device 502 also constituting machine-readable storage media. The instructions 526 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   encrypting content to generate encrypted content;
   inserting a known pattern of metadata into each of a set of headers of the encrypted content and each of a set of footers of the encrypted content;
   inserting the encrypted content into a structured file;
   detecting that a structure of the structured file has been damaged;
   identifying the encrypted content based at least in part on identifying one or more of the set of headers and one or more of the set of footers of the encrypted content; and
   decrypting the encrypted content.

2. The method of claim 1, further comprising:
   dividing the content into a set of chunks, wherein encrypting the content comprises appending a header and a footer to each chunk in the set of chunks, and wherein inserting the known pattern of metadata comprises inserting the known pattern of metadata into the header and the footer of each chunk in the set of chunks.

3. The method of claim 2, wherein the dividing is performed using a deterministic algorithm.

4. The method of claim 2, wherein identifying the encrypted content comprises identifying one or more chunks of the set of chunks by identifying both a header and a footer of each of the one or more chunks.

5. The method of claim 4, wherein each of the one or more chunks are unaffected by damage to the structure of the structured file.

6. The method of claim 2, wherein detecting that a structure of the structured file has been damaged comprises detecting that a header or footer of one or more chunks of the set of chunks has been damaged or an internal file structure of the structured file has been damaged.

7. The method of claim 1, wherein the known pattern of metadata comprises a special pattern, an original file name of the content, an encryption standard used to encrypt the content, a version number of the encryption standard used and an ID of an encryption key used to encrypt the content.

8. A system comprising:
   a processor; and
   a memory coupled to the processor to store instructions, which when executed by the processor, cause the processor to perform data storage operations, the operations including:
   encrypting content to generate encrypted content;
   inserting a known pattern of metadata into each of a set of headers of the encrypted content and each of a set of footers of the encrypted content;
   inserting the encrypted content into a structured file;
   detecting that a structure of the structured file has been damaged;
   identifying the encrypted content based at least in part on identifying one or more of the set of headers and one or more of the set of footers of the encrypted content; and
   decrypting the encrypted content.

9. The system of claim 8, the operations further comprising:
   dividing the content into a set of chunks, wherein encrypting the content comprises appending a header and a footer to each chunk in the set of chunks, and wherein inserting the known pattern of metadata comprises inserting the known pattern of metadata into the header and the footer of each chunk in the set of chunks.

10. The system of claim 9, wherein the dividing is performed using a deterministic algorithm.

11. The system of claim 9, wherein identifying the encrypted content comprises identifying one or more chunks of the set of chunks by identifying both a header and a footer of each of the one or more chunks.

12. The system of claim 11, wherein each of the one or more chunks are unaffected by damage to the structure of the structured file.

13. The system of claim 9, wherein detecting that a structure of the structured file has been damaged comprises detecting that a header or footer of one or more chunks of the set of chunks has been damaged or an internal file structure of the structured file has been damaged.

14. The system of claim 8, wherein the known pattern of metadata comprises a special pattern, an original file name of the content, an encryption standard used to encrypt the content, a version number of the encryption standard used and an ID of an encryption key used to encrypt the content.

15. A non-transitory machine-readable medium having instructions stored therein, which when executed by a processor, cause the processor to perform operations, the operations comprising:
    encrypting content to generate encrypted content;
    inserting a known pattern of metadata into each of a set of headers of the encrypted content and each of a set of footers of the encrypted content;
    inserting the encrypted content into a structured file;
    detecting that a structure of the structured file has been damaged;
    identifying the encrypted content based at least in part on identifying one or more of the set of headers and one or more of the set of footers of the encrypted content; and
    decrypting the encrypted content.

16. The non-transitory machine-readable medium of claim 15, the operations further comprising:
    dividing the content into a set of chunks, wherein encrypting the content comprises appending a header and a footer to each chunk in the set of chunks, and wherein inserting the known pattern of metadata comprises inserting the known pattern of metadata into the header and the footer of each chunk in the set of chunks.

17. The non-transitory machine-readable medium of claim 16, wherein the dividing is performed using a deterministic algorithm.

18. The non-transitory machine-readable medium of claim 16, wherein identifying the encrypted content comprises identifying one or more chunks of the set of chunks by identifying both a header and a footer of each of the one or more chunks.

19. The method of claim 18, wherein each of the one or more chunks are unaffected by damage to the structure of the structured file.

20. The non-transitory machine-readable medium of claim 15, wherein the known pattern of metadata comprises a special pattern, an original file name of the content, an encryption standard used to encrypt the content, a version number of the encryption standard used and an ID of an encryption key used to encrypt the content.

* * * * *